Sept. 16, 1952  J. R. McMILLIN ET AL  2,610,337
CUSHION
Filed Aug. 27, 1949

Inventors:
James R. McMillin
and William Sakarash,
By Staelin & Overman
Attorneys.

Patented Sept. 16, 1952

2,610,337

UNITED STATES PATENT OFFICE 2,610,337

CUSHION

James R. McMillin and William Sakarash, Newark, Ohio, assignors to Owens-Corning Fiberglas Corporation, Toledo, Ohio, a corporation of Delaware Application August 27, 1949, Serial No. 112,668

9 Claims. (Cl. 5—361)

This invention relates to a particular arrangement of glass or other mineral fibers in mat or bat form characterized by having combined features of softness, resiliency, and resistance to disintegration, features which are desired in a filling material for cushions, pillows, mattresses, clothing interliners, and the like.

It is an object of this invention to produce an arrangement of glass fibers for use as a filling material in cushions, pillows, mattresses, clothing, and the like.

Another object is to provide a filling material of glass fibers which embodies the characteristics of long life under rigorous treatment operating as an incidence to normal use in applications of the type described.

A further object is to produce a filling material of glass fibers arranged in a manner to minimize packing of the fibers and to absorb the destructive forces to which the fibers are exposed as an incidence to normal use without impairing flexibility and softness of the structure.

These and other objects and advantages of this invention will hereinafter appear, and for purposes of illustration, but not of limitation, embodiments are shown in the accompanying drawings, in which.

Figure 1:
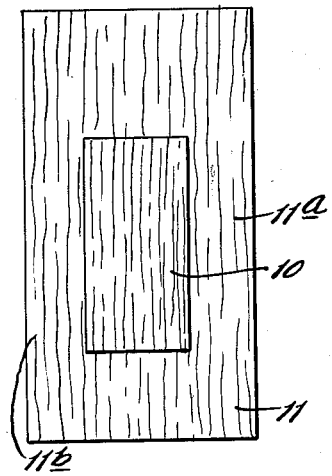
Figures 1 to 3 and 5 show the sequence of steps in manufacturing a pillow illustrative of the features embodied in this invention.
Figure 2:

Invention resides in the novel arrangement of very fine glass fibers in alternate layers of bonded and unbonded mats or bats with the bonded mats or bats usually constituting the outer layers of the finished structure.

Since masses of glass fibers are able to withstand substantial compressive forces but disintegrate in shear, it will be apparent that the shear and abrading forces operating between fibers bonded one to another at their intersections will militate against the successful use of bats of interbonded fibers in a cushion or the like without other provisions for absorbing the shear or abrading forces which come into place as an incidence to normal use. On this account, bonded bats do not give the desired service life in a cushion because the fibers break or are ground up during flexure. Furthermore, the bonding agent by which the fibers are secured one to another tends to deteriorate under high humidity conditions which are sometimes encountered in service. On the other hand, bonded bats exhibit the desirable characteristics of resistance to compression and greater resiliency which are characteristics desirable in cushions and filling materials of the type described.

Sidewise forces, which usually cause breakdown in shear of interbonded glass fibers, are substantially completely absorbed in bats of unbonded glass fibers, especially when the fibers are coated with lubricant to minimize the effect of mutual abrasion. Unbonded bats, however, are incapable of serving alone as a filling material because there is a tendency for the fibers to pack whereby the cushion or the like is not automatically returned to its original dimension.

The present structure combines these two individually unsatisfactory elements in a manner which overcomes to large extent the shortcomings of both. The unbonded bat, which defines the outer walls of the structure and is interleaved between layers of bonded bat, absorbs the operating shear forces and gives freedom in relative movement, while the bat of bonded fibers lends rigidity and resiliency to the structure. A pillow or cushion embodying features of this invention is able to withstand more than a million and a half repeated compressions under load without noticeable effect on the fibers or on the resiliency of the structure. This is to be compared to the obvious failure in about one hundred thousand strokes on pillows constructed of either bonded or unbonded fibers alone.

Glass fibers most suitable for such filling material are the ultra-fine fibers having dimensions of about 0.00015 to 0.0001 inch in diameter or less. They are first formed into respectively bonded or unbonded mats by various known techniques, such as those corresponding to the teaching of the Slayter and Thomas United States Patent No. 2,133,236, or the Bergin and Simison Patent No. 2,252,157. Briefly described, the attenuated glass fibers are rained down from above and collected on a moving belt traveling at a rate selected to give a build-up of fibers of predetermined thickness, which, for the purposes described, preferably range from about ½ to 2 inches. Either lubricant or bonding agent, depending on whether unbonded or bonded mat, respectively, is to be produced, is usually incorporated with the depositing fibers, but may instead be subsequently added by such means as flow coating, spraying, dipping, and the like. As pointed out in the Bergin and Simison patent, it is expedient to incorporate some lubricant into the bonded mat or incorporate lubricant in the bonding agent to enhance the characteristics thereof.

Suitable lubricants for the manufacture of unbonded mat may be selected from the organo-silicon compounds including the silanes of the type $R_nSiX_{4-n}$, their hydrolysis products and their polymerization products, where R is an organic radical of the type aliphatic, alicyclic, aromatic, heterocyclic, mixed aliphatic aromatic, and derivatives thereof, of the type described in Patent No. 2,392,805. When aliphatic, the aliphatic group may be saturated or unsaturated, branched or straight-chained; where X is a readily hydrolyzable group, such as hydrogen, halogen, amino, alkoxy, aroxy, acyloxy, and the like; and where $n$ is either 1, 2 or 3. Generally, the more stable polymerized products of low molecular weight having oily consistency are preferred. These include the polysiloxanes or silicones of low molecular weight, such as dimethyl polysiloxane, diethyl polysiloxane, lauryl methyl polysiloxane, methyl phenyl polysiloxane and the like.

Other lubricants may be used instead of or in combination with the organo-silicon compounds. Representative of such other suitable substances are the Werner or chrome complex compounds of the type described in the Iler Patent No. 2,773,040, wherein an acido group having more than eight carbon atoms is coordinated with a trivalent chromium atom; cationic-active amine complex compounds of the type described in the patent to Sloan No. 2,356,542, wherein an organic group having more than eight carbon atoms is associated with a basic nitrogen, phosphorus, or sulphur atom; metallic and ammonium soaps of saturated or unsaturated long chain fatty acids; paraffin, oils, waxes, and the like, and mixtures thereof.

The desired amount of lubricant may be incorporated from solvent solution or aqueous dispersions and emulsions. Ordinarily, 2 to 5% by weight of lubricant on the fibers is sufficient to impart the desired lubricity to the fibers, enabling their relative movement without harmful effects, but the amount of lubricant may be increased, when desired, to about 10%. Representative lubricating compositions may comprise a 4% solution of diethyl polysiloxane in methyl ethyl ketone or a 5% aqueous dispersion consisting of 1 part cationic-active substance, such as didodecyl-ammonium chloride, with 4 parts dimethyl polysiloxane. The lubricating composition may be applied by spraying onto the fibers as they are rained down from above or else the composition may be applied subsequent to fiber deposition by suitable means, such as spraying, flow coating, dipping, and the like. The diluent may be eliminated by a simple air dry, but it is more expedient to hasten the removal of the diluent by exposure of the mat to temperatures in the range of 175° to 300° F. for about ten to thirty minutes.

In bonded mat, the material combined with the glass fibers is an adhesive capable of setting to secure the fibers one to another at their junctures. Setting may take place as an incidence to drying or by subsequent polymerization to a cured stage under the influence of time, temperature, or a catalyst. Suitable bonding agents include the reaction products of phenol and derivatives thereof, such as cresylic acid, resorcinol, and the like, or urea and derivatives thereof, such as melamine, guanidine, dicyandiamide, and the like, with an aldehyde, such as formaldehyde. Bonding agents include the polyesters and alkyds of the type formed by reaction of a saturated or unsaturated polybasic acid with a saturated or unsaturated polyhydric alcohol; the thermoplastic resinous materials capable of bonding upon evaporation of the solvent; and elastomers of the type butadiene-acrylonitrile copolymer and butadiene-styrene copolymer. An excellent bonding agent for the manufacture of suitable mat is formed by a compatible mixture of phenolic resin and butadiene-acrylonitrile elastomer in which the materials may range from 3 parts elastomer and 1 part of phenolic resin to 1 part of elastomer and 3 parts phenolic resin, depending primarily upon the stiffness required in the bonded bat.

With such ultra-fine glass fibers, as much as 25 to 30% bonding agent may be used without causing undue stiffness, and although the bat becomes less resilient with decreased amounts of binder, as little as 5% by weight of the binder, when calculated on the weight of the finished product, has been successfully employed.

Best use is made of an "A" stage phenolic resin applied from a 3 to 10% water solution in amounts to deposit 15 to 20% by weight of binder in the production of a bat having a density of about one-half pound per cubic foot. In combination with this specific formula or other binder formulations, 1 to 5% by weight of lubricant of the type previously described may be used, as in the manner set forth in the Bergin and Simison patent.

As in the manufacture of lubricated bats, the binder composition may be incorporated with the fibers as they are rained down from above or else applied to the formed bat. The treated bat is subsequently baked at elevated temperatures ranging from 250° to 400° F. for 5 to 20 minutes to drive off the diluent and set the binder.

Figure 4:
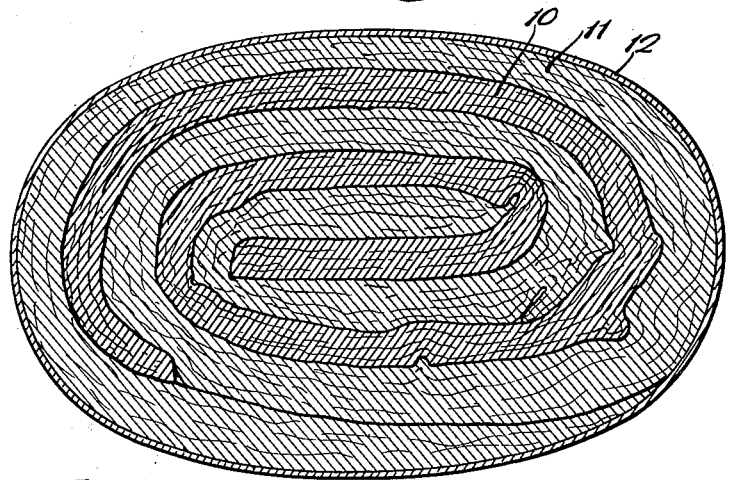
Figure 4 is a sectional view through a pillow embodying features of this invention.
Figure 6:
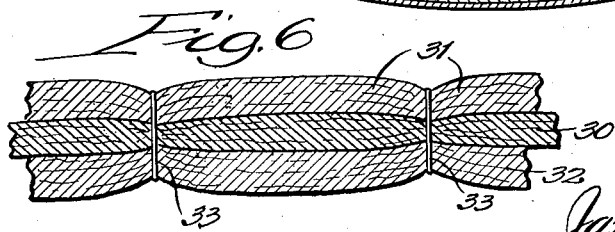
Figure 6 is a fragmentary sectional view of an interliner for clothing embodying features of this invention.

In the manufacture of a pillow of the type shown in Figure 4 of the drawing, a small substantially rectangular piece of bonded bat 10 ranging in thickness from ½ to 2 inches is disposed upon an intermediate portion of a substantially larger rectangular section of unbonded, lubricated bat 11 ranging in thickness from ½ to 2 inches.

Figure 3:
Figure 5:
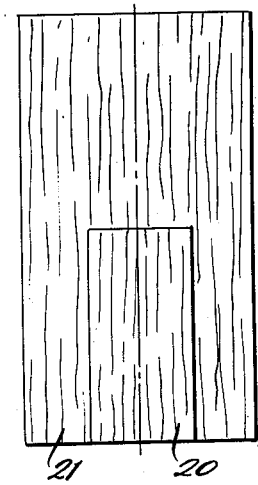

The width of the unbonded bat 11 is such as will completely enclose the bonded bat 10 when the uncovered side portions 11a and 11b are folded over into overlapping relation onto the bat 10. As shown in Figure 3, one end portion 11c of the folded, unbonded bat 11 may be turned to form a substantially trapezoidal shape which may then be folded over and over until the structure is arranged in the form of a "jelly-roll" wherein the outer portion consists of one or more layers of unbonded bat and with other layers alternating between layers of bonded bat. Thus enclosing the bonded bat there is always one or more layers of unbonded bat to absorb substantially all of the sidewise strain which otherwise might cause deterioration of fibers in the bonded bat. The "jelly-roll" is then slipped into a suitable ticking 12 to form the completed pillow or cushion.

Instead of arranging the elements and folding the elements in the manner described, the bonded bat 20 may be positioned at one end of the unbonded bat 21 but intermediate the side edges which, upon folding, completely enclose the bonded bat 20. From this point, the folded structure may be rolled or folded to form a "jellyroll" having the desired arrangement of unbonded and bonded bats in alternate layers.

In cases requiring a flat product, the bonded bat 30 may merely be inserted between one or more layers of unbonded bats 31 and 32, which layers are held in position by stitching 33 or other suitable means. Instead of the three layers shown, any multiple of layers may be employed embodying the feature of having unbonded bats arranged as the outer walls and covering layers of bonded bats.

The desired arrangement of fibers may be secured by partially impregnating one panel section of a lubricated bat of glass with a bonding agent and then setting the adhesive. When the bat is folded or rolled upon itself with the wall of unbonded bat outermost, the desired relationship of alternate layers is secured with the outer layers comprising unbonded or lubricated glass fibers.

It will be apparent from the description that there has been produced a new and improved glass fiber structure adapted for use in pillows, mattresses, cushions, and the like, and embodying at least two separately identifiable elements in a new and novel arrangement, elements which were heretofore unsuitable alone for these specific purposes. It has been found that the cushioning effect secured by fiber arrangements embodying features of this invention may also be used as dampeners in slowing down or absorbing shock or impact imposed from any direction without harmful effect.

It will be understood that numerous changes may be made in the materials, construction, and arrangement without departing from the spirit of the invention, especially as defined in the following claims.

We claim:

1. A filling material for pillows, cushions and the like comprising a package formed of alternate layers of ultra fine glass fibers, the fibers in the outer and alternate layers being unbonded and free of resinous material to form a soft, fluffy, highly porous mass, the fibers in the intermediate layers being bonded one to another with a small amount of resinous material into a soft, highly porous, resilient mass.

2. A filling material for pillows, cushions and the like comprising a package formed of alternate layers of ultra fine glass fibers, the fibers in the outer and alternate layers being unbonded and free of resinous material but lubricated to form a soft, fluffy, highly porous mass, the fibers in the intermediate layers being bonded one to another with a small amount of resinous material into a soft, highly porous, resilient mass.

3. A filling material for pillows, cushions and the like comprising a package formed of alternate layers of glass fibers having a diameter less than 0.00015 inch, the fibers in the outer and alternate layers being unbonded and free of resinous material to form a fluffy, highly porous mass, the fibers in the intermediate layers being bonded one to another with a small amount of resinous material and lubricant into a soft, highly porous, resilient mass.

4. A filling material for pillows, cushions and the like comprising a package formed of alternate layers of ultra fine glass fibers and having a density of about one-half pound per cubic foot, the fibers in the outer and alternate layers being unbonded and free of resinous material, the fibers in the intermediate layers being bonded one to another with a small amount of resinous material to form a highly porous, resilient mass.

5. A filling material as claimed in claim 2 in which the lubricant in the unbonded layers is present in amounts ranging from 1–10 percent by weight.

6. A filling material as claimed in claim 1 in which the resinous material in the bonded layers comprises 5–25 percent by weight resin.

7. A filling material as claimed in claim 1, in which the bonding agent is a cured thermosetting resin admixed with about 1 to 5% by weight of the fibers with an incompatible lubricant.

8. A cushion comprising a jelly-roll arrangement of bonded and unbonded layers of glass fibers, the bonded layers containing 5–25 percent by weight of resinous material to secure the fibers together into a highly porous, resilient mass, the fibers in the unbonded mass being free of resinous material and lubricated with 1–10 percent by weight lubricant to form a soft, fluffy, highly porous mass, and a ticking enclosing the jelly-roll layers.

9. A cushion as claimed in claim 8 in which the layers are each formed to a density of about one-half pound per cubic foot.

JAMES R. McMILLIN.
WILLIAM SAKARASH.

REFERENCES CITED

The following references are of record in the file of this patent:

UNITED STATES PATENTS

| Number | Name | Date |
| --- | --- | --- |
| 683,208 | Kelly | Sept. 24, 1901 |
| 1,256,088 | Woll | Feb. 12, 1918 |
| 2,175,226 | Slayter | Oct. 10, 1939 |
| 2,343,601 | Weimann | Mar. 7, 1944 |